(12) United States Patent
Billingsley et al.

(10) Patent No.: US 9,259,676 B2
(45) Date of Patent: Feb. 16, 2016

(54) REFILLABLE FILTER SYSTEM

(75) Inventors: Britton G. Billingsley, St. Paul, MN (US); David M. Castiglione, Hudson, WI (US); Gary E. Dwyer, Mallorytown (CA); Pierre Legare, Brockville (CA)

(73) Assignee: 3M Innovative Properties Company, St. Paul, MN (US)

( * ) Notice: Subject to any disclaimer, the term of this patent is extended or adjusted under 35 U.S.C. 154(b) by 1048 days.

(21) Appl. No.: 13/140,064

(22) PCT Filed: Dec. 4, 2009

(86) PCT No.: PCT/US2009/066698
§ 371 (c)(1),
(2), (4) Date: Sep. 9, 2011

(87) PCT Pub. No.: WO2010/074922
PCT Pub. Date: Jul. 1, 2010

(65) Prior Publication Data
US 2011/0311400 A1  Dec. 22, 2011

Related U.S. Application Data

(60) Provisional application No. 61/139,760, filed on Dec. 22, 2008.

(51) Int. Cl.
*A62B 7/00* (2006.01)
*B01D 46/24* (2006.01)
*B01D 46/00* (2006.01)

(52) U.S. Cl.
CPC ........ *B01D 46/2411* (2013.01); *B01D 46/0024* (2013.01); *B01D 46/0036* (2013.01)

(58) Field of Classification Search
CPC .................................. A62B 7/00; B01D 50/00
USPC ................ 422/120, 121; 55/482; 96/147, 138
See application file for complete search history.

(56) References Cited

U.S. PATENT DOCUMENTS

| | | | |
|---|---|---|---|
| 4,838,901 A | 6/1989 | Schmidt | |
| 5,328,609 A | 7/1994 | Magnusson et al. | |
| 5,772,713 A * | 6/1998 | Salinas et al. | 55/496 |
| 6,093,237 A | 7/2000 | Keller et al. | |
| 6,152,996 A * | 11/2000 | Linnersten et al. | 96/135 |
| 6,391,429 B1 | 5/2002 | Senkus et al. | |
| 6,409,919 B1 | 6/2002 | Tara | |
| 6,767,860 B2 | 7/2004 | Hern et al. | |
| 7,081,201 B2 | 7/2006 | Bassett et al. | |
| 7,279,091 B2 | 10/2007 | Sann et al. | |

(Continued)

FOREIGN PATENT DOCUMENTS

| | | |
|---|---|---|
| KR | 10-2004-0107953 | 12/2004 |
| WO | WO 97/22394 | 6/1997 |

OTHER PUBLICATIONS

Supplemental European Search Report for European Patent Application No. 09835490.5-1213, dated May 3, 2012.

(Continued)

*Primary Examiner* — Sean E Conley
(74) *Attorney, Agent, or Firm* — Jeffrey M. Olofson

(57) ABSTRACT

A radial flow filtration system includes a housing and one or more generally cylindrical filter cartridges including a filter cartridge shell and a filter section. The filter cartridge is removable with respect to the housing and the filter section in removable with respect to the filter cartridge shell.

22 Claims, 6 Drawing Sheets

(56) References Cited

U.S. PATENT DOCUMENTS

| | | |
|---|---|---|
| 7,320,721 B2 | 1/2008 | Ham et al. |
| 7,481,234 B1 * | 1/2009 | Gustafson et al. .............. 135/91 |
| 2003/0041572 A1 | 3/2003 | Lohr |
| 2006/0096911 A1 | 5/2006 | Brey et al. |
| 2006/0207232 A1 * | 9/2006 | Ham et al. ................... 55/385.1 |
| 2007/0241045 A1 | 10/2007 | Kott et al. |

OTHER PUBLICATIONS

Technical Report NW002566, "CBR/TIC filter Design and Evaluation", report NW002566, New World Associates, Inc., Van Doren et al, Dec. 2006.

* cited by examiner

REFILLABLE FILTER SYSTEM

CROSS REFERENCE TO RELATED APPLICATIONS

This application is a national stage filing under 35 U.S.C. 371 of PCT/US2009/066698, filed Dec. 4, 2009, which claims priority to U.S. patent application No. 61/139760, filed Dec. 22, 2008, the disclosure of which is incorporated by reference in its/their entirety herein.

FIELD OF DISCLOSURE

The present disclosure pertains to radial flow filtration systems, which may be used as collective protection filters in ventilation systems. More particularly, the present disclosure pertains to radial flow filtration systems including at least one removable filter section.

BACKGROUND

Air handling systems are commonly fitted with filters that remove chemical and particulate hazards from the air supply. Such systems can be used in a variety of situations including protection within buildings and on mobile locations such as ships. Filters commonly used for collective protection air handling systems are often cylindrically shaped and have an inlet at the inner surface of the filter housing. The outlet of such filters is typically located at the outermost periphery of the filter. Such filters typically have a pleated particulate filter section intended to target particulate contaminants that is disposed near the inlet of the filter. They also often have a chemical filter bed that targets gases. Known filter beds include packed filter beds, and bonded particle masses. Filter beds may include multiple layers. The chemical and particulate filter elements within the filter system may be contained as layers in a single filter element or deployed as separate filter elements.

Many filters are disposable. When known filters require replacement, either the entire unit including the housing is discarded and replaced or the individual cartridge is removed from the housing and then discarded and replaced. There exists a need for improved filter systems that are less expensive and create less waste.

SUMMARY

In one aspect, the present application is directed to a radial flow filtration system comprising a housing having an interior, an inlet and an outlet. A generally cylindrical filter cartridge is disposed in the interior of the housing. The filter cartridge comprising a cartridge shell and a filter section disposed within the cartridge shell. The filter cartridge is removable with respect to the housing, and the filter section is removable with respect to the cartridge shell. In some exemplary embodiments, a particulate filter section is also disposed in the interior of the housing.

In another aspect, the present application is directed to a radial flow filtration system comprising a housing having an interior, an inlet and an outlet. A first generally cylindrical filter cartridge is disposed in the interior of the housing. The first filter cartridge comprises a first cartridge shell and a first filter section disposed within the first cartridge shell. A second generally cylindrical filter cartridge is disposed in the interior of the housing. The second filter cartridge comprising a second cartridge shell and a second filter section disposed within the second cartridge shell. At least one of the first and second cartridges is removable with respect to the housing, and the filter section of that cartridge is removable with respect to that cartridge shell.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Typical exemplary embodiments of the present disclosure include radial flow filter systems including at least one filter cartridge that is removable with respect to the housing. An exemplary filter cartridge includes a cartridge shell and a filter section. The filter section of the exemplary cartridge is removable with respect to the cartridge shell. Thus, in exemplary embodiments of the present disclosure, when a single filter section needs to be replaced, the removability of the cartridge with respect to the housing and of the filter section with respect to the cartridge shell allow the user to replace the spent filter section without disposing of the entire housing or the entire filter cartridge. Exemplary embodiments of the present disclosure may help reduce long term maintenance expense and waste by allowing the housing and cartridge shell to be provided with fresh filter sections.

Figure 1:
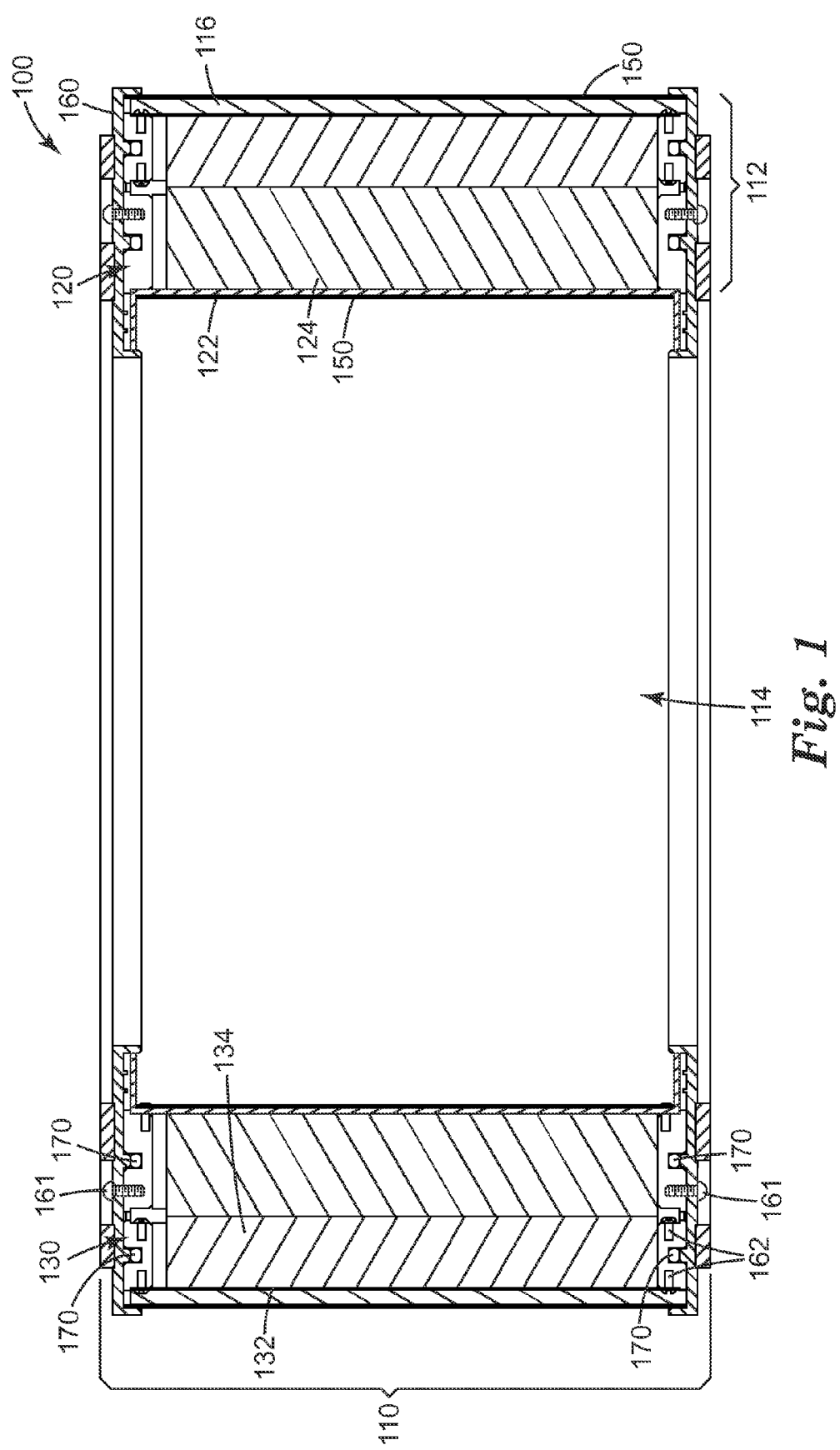
FIG. 1 shows schematically an exemplary radial flow filtration system including two filter sections.

An exemplary radial flow filtration system 100 shown in FIG. 1 includes a housing 110 having an interior 112 wherein two generally cylindrical filter cartridges 120, 130 are disposed in the interior 112 of the housing 110. In an exemplary embodiment, the housing 110 includes walls 150 disposed at the inner and outer edges of the generally cylindrically filtration system 100. For example, the walls 150 could include an inner screen and an outer screen, which may be used to enclose and protect the elements disposed in the interior 112 of the housing 110, for example, during shipping and handling. Walls 150 can be made of perforated metal such as aluminum or steel or engineered plastics. Openings in the metal can be, for example, round with a diameter of one-eighth or three-sixteenths of an inch or more or less. The housing 110 may also include caps 160 on one or both ends of the filter system 100 which unitize the various filter cartridges 120, 130 into a single filter system 100. For example, the caps 160 may be constructed of metal such as aluminum or steel or engineered plastics.

The caps 160 may be substantially flat and disk-shaped with a hole in the center. In some embodiments, the diameter of the cap 160 is substantially the same as the diameter of the outer screen and the diameter of the hole in the center of the cap 160 is substantially the same as the diameter of the inner screen. Alternatively, the diameter of the cap 160 may be larger or smaller than the diameter of the outer screen and the diameter of the hole in the center of the cap may be larger or smaller than the diameter of the inner screen. In other exemplary embodiments, the filter housing 110 or the caps 160 may have any other suitable configuration. The caps 160 may also feature multiple protrusions or depressions. For example, the protrusions may include rims at the inner and/or outer edges of the caps 160. Additional protrusions or depressions may be provided at varying diameters on the caps to engage gaskets 170 which seal the ends of the filter cartridges 120, 130 to the end caps 160. The caps 160 may have depressions in them to permit the passage of vertical bolts 161 securing holding end caps 160 to filter cartridges 120, 130. In the illustrated embodiment, horizontal bolts 162 support a flush mounting of walls of filter cartridge shells 122, 132 to filter cartridge covers.

In the illustrated embodiment, the inlet 114 of the housing 110 may be located at the inner periphery of the housing 110. The outlet 116, which is in fluid communication with the inlet 114, may be located at the outer periphery of the housing 110. For example, when the filter system 100 is placed in an air handling system 600 shown in FIG. 6, the air is routed to the inlet 114 located in the inner circumference of the housing 110. The air then may pass through each of the filter cartridges beginning with the cartridge disposed nearest the inlet 114 until it passes through the outlet 116. The present disclosure may also be used in other fluid handling systems, and embodiments of the present disclosure may have different configurations and locations of the inlet 114 and outlet 116.

Figure 2:
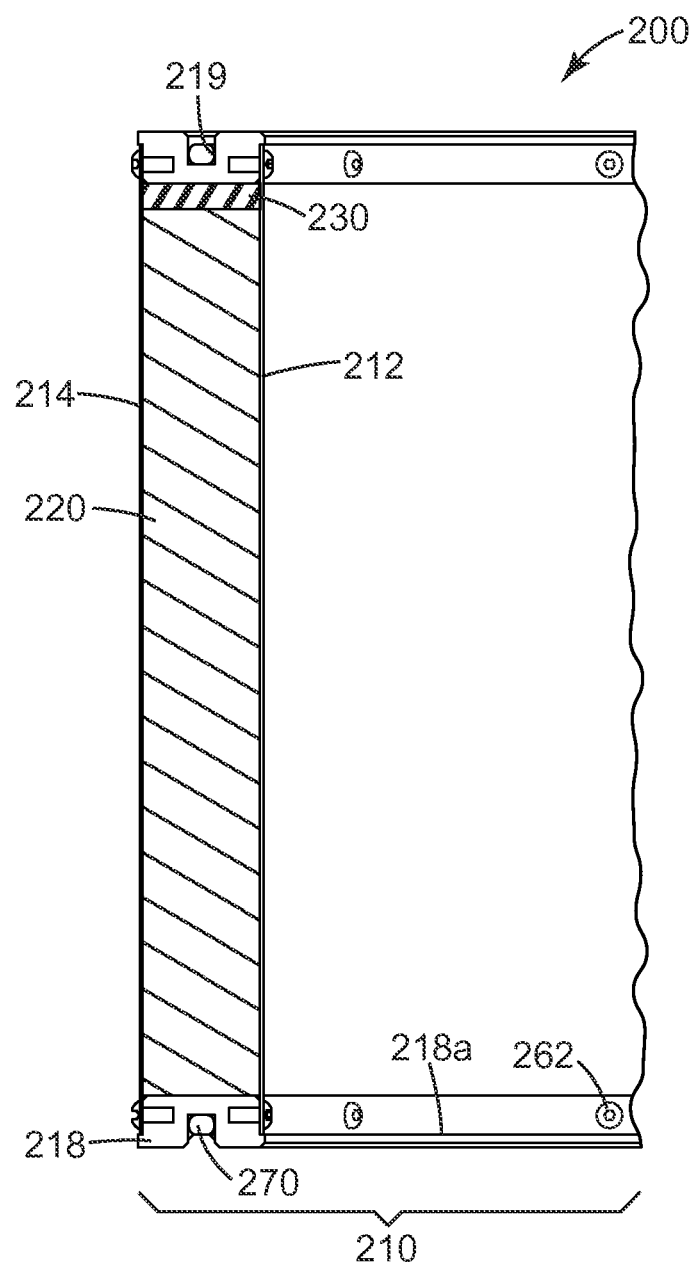
FIG. 2 shows schematically a section view of one exemplary filter cartridge.

FIG. 2 illustrates a cross section of an exemplary filter cartridge 200. A filter cartridge 200 includes a cartridge shell 210 and a filter section 220. The cartridge shell 210, in some embodiments, may include a generally cylindrical permeable inner wall 212 and a generally cylindrical permeable outer wall 214. The walls 212, 214 may be made of any suitable materials such as perforated metal sheets, such as steel or aluminum sheets, or engineered plastics. The diameters of the inner wall 212 and the outer wall 214 are dependent upon the composition and size of the filter section 220, the disposition of the filter cartridge 200 within the housing 110, the number of cartridges 200 disposed in the housing 110, industry standards for existing air handling systems and other relevant considerations. In one embodiment, the distance between an inner wall 212 and outer wall 214 may be about 5 centimeters. However, dimensions of cartridge walls 212, 214 can vary significantly based on the factors discussed above.

As shown in FIG. 2, in an exemplary embodiment, a cartridge shell 210 may also include one or two covers 218, which in some embodiments may be generally disk shaped or ring shaped with an opening in the center of the cover 218. The diameter of cover 218 may be similar to or slightly larger or smaller than the diameter of the outer wall 214, and the diameter of the opening in the center of the cover 218 may be similar to or slightly larger or smaller than the diameter of the inner wall 212. A cartridge cover 218 may include impermeable material, such as engineered plastic, or metal, such as aluminum or steel. A cartridge cover 218 can be generally perpendicular to walls 212, 214 when the cartridge is assembled. In one embodiment, a cartridge cover 218 may fit primarily within the walls 212, 214 with an outer lip 218a extending so as to mate with the walls 212, 214. Alternatively, the diameter of a cover 218 may be larger or smaller than the diameter of the outer wall 214, and the diameter of the opening in the center of the cover may be larger or smaller than the diameter of the inner wall 212. The walls 212, 214 can then be secured to the cartridge cover by screws 262 passing through the walls 212, 214, preferably generally perpendicularly to the walls, and into the width of the cartridge cover 218. A cartridge cover 218 may also include a groove 219 by which to engage a gasket 270 to provide a seal between a cartridge cover 218 and an end cap 160.

According to an exemplary embodiment as shown in FIG. 2, a filter section 220 contained within the filter shell 210 may include either a chemical or particulate filter section 200, or both. In an embodiment containing a chemical filter section 220, the filter section 220 may include a packed filter bed, a particle loaded web, a bonded particle mass or other types of chemical filter elements.

In one embodiment, the filter section 220 may include a chemical filtering medium, such as a filter bed, which may include a packed filter bed and a compression pad 230. Alternatively, the filter section 220 may include bonded carbons such as those discussed in U.S. Pat. No. 6,391,429, or, for example, non-woven webs including polymeric fibers and carbon particles enmeshed in the fibers.

The packed bed may be loaded by any suitable method, such as a storm filling method where particles are poured down a tube with cross-wires located to ensure that the carbon falls evenly and packs into the container to as high a packing density as practical. The filter bed may, for example, include sorbent particles and/or catalysts. Exemplary chemical filtering media may include any one or more of activated carbon, alumina, zeolite, silica, catalyst supports and the like.

Examples of compounds or substances that can be used in the chemical filtering medium according to the present disclosure include zinc chloride ($ZnCl_2$) treated carbon which removes ammonia ($NH_3$) and organic vapors (OVs); an exemplary activated carbon, impregnated with copper, silver, zinc, molybdenum, and triethlyenediamine (TEDA). Suitable particles also include activated carbons, such as multigas activated carbons including one or more of copper, zinc, molybdenum, sulfuric acid and a salt thereof, such as carbons available form Calgon Carbon Corporation, and particularly, an activated carbon type such as Universal Respirator Carbon (URC), which includes copper and zinc in a total amount of not more than 20%, molybdenum compounds of up to 10%, sulfuric acid or a salt thereof of up to 10%, and can remove acid gases (such as $SO_2$, $H_2S$), basic gases (such as $NH_3$), hydrogen cyanide and organic vapors (such as $CCl_4$, toluene, most hydrocarbons). Other exemplary particles include a zinc acetate and potassium carbonate treated carbon material as described in U.S. Pat. No. 5,344,626, which can remove acid gases, hydrogen cyanide, and organic vapors; an untreated carbon such as a coconut based, acid washed carbon without additional chemistries which, can remove organic vapors; or a zeolite.

In some exemplary embodiments, mesh size for sorbent particles can be about 20×40 where '20' refers to a mesh density through which substantially all of the particles would fall through and '40' refers to a mesh density that is sufficiently high so as to retain substantially all of the particles. For example, a mesh size of 20×40 means that substantially all of the particles would fall through a mesh having a mesh density of 20 wires per inch and substantially all of the particles would be retained by a mesh density having a density of 40 wires per inch. Selecting an appropriate mesh size requires balancing density and filter capacity against air flow resistance. Generally a finer mesh size provides greater density and filter capacity, but also higher airflow resistance. Balancing these concerns, specific examples mesh sizes found to be suitable in the present disclosure include, but are not limited to, 12×20, 12×30, 12×40 and 20×40. In an exemplary embodiment utilizing a packed filter bed, a compression pad 230 can placed on top of the particles between the inner and outer walls 212, 214 to maintain even distribution of particles.

In an exemplary embodiment, a chemical filter section 220 may include a particle loaded web. The web can be made according to the process described in United States Published Application No. 2006/0096911 A1, incorporated herein by reference. The same chemical filtering particles that can be used in the packed bed can be used in a loaded web, though the particles may have a different mesh size. The mesh size for sorbent particles enmeshed in a web can be about 40×140. Alternatively, the web may be pleated. Taking these factors into consideration, a web, for example, may include sorbent particles with a mesh size including about 12×20 to about 80×325.

Referring back to FIGS. 1 and 2, an exemplary filter section, such as filter sections 124, 134 enclosed in filter cartridge shells 122, 132, can be removed from a filter system housing 110 by the method of first removing a cap 160 from the housing 110. This may include removing bolts 161 or any other fastener used to secure the cap 160 to the housing 110. Second, the filter cartridge 120, 130 can be removed from the interior 112 of the housing 110. Third, a cover or multiple covers 218, as those shown in FIG. 2, can be removed from the end or ends of the filter cartridge 200. This may include removing screws 262 that secure the cover 218 to walls 212, 214 of the shell 210 and, in some embodiments, may include removing a compression pad 230. In an embodiment where a cartridge shell 210 has two covers 218, both covers can be removed, and the inner wall 212, filter section 220 and outer wall 214 can be separated from each other. Alternately, one cover 218 may be removed and the filter section 220 can be removed from between the walls 212, 214 by any means including lifting, sliding, pouring, detaching, and the like. In an embodiment where only one cover 218 can be removed, the filter section 220 can be removed by any means including lifting, sliding, pouring, detaching, and the like. Thereby, the filter section 220 may be removed with respect to the cartridge shell 210. The filter section 220 can then be replaced with another filter section 220 with similar or different filtering properties. For example, a filter section containing one type of carbon may be replaced by a filter section containing another type of carbon. The new filter section 220 can be placed within the filter cartridge shell 210. In exemplary embodiments, any cover 218 or screw 262 that had been removed can be returned to their former disposition. The filter cartridge 120, 130 can then be returned to the housing 110 to form a refurbished radial filter system 100.

Figure 3:
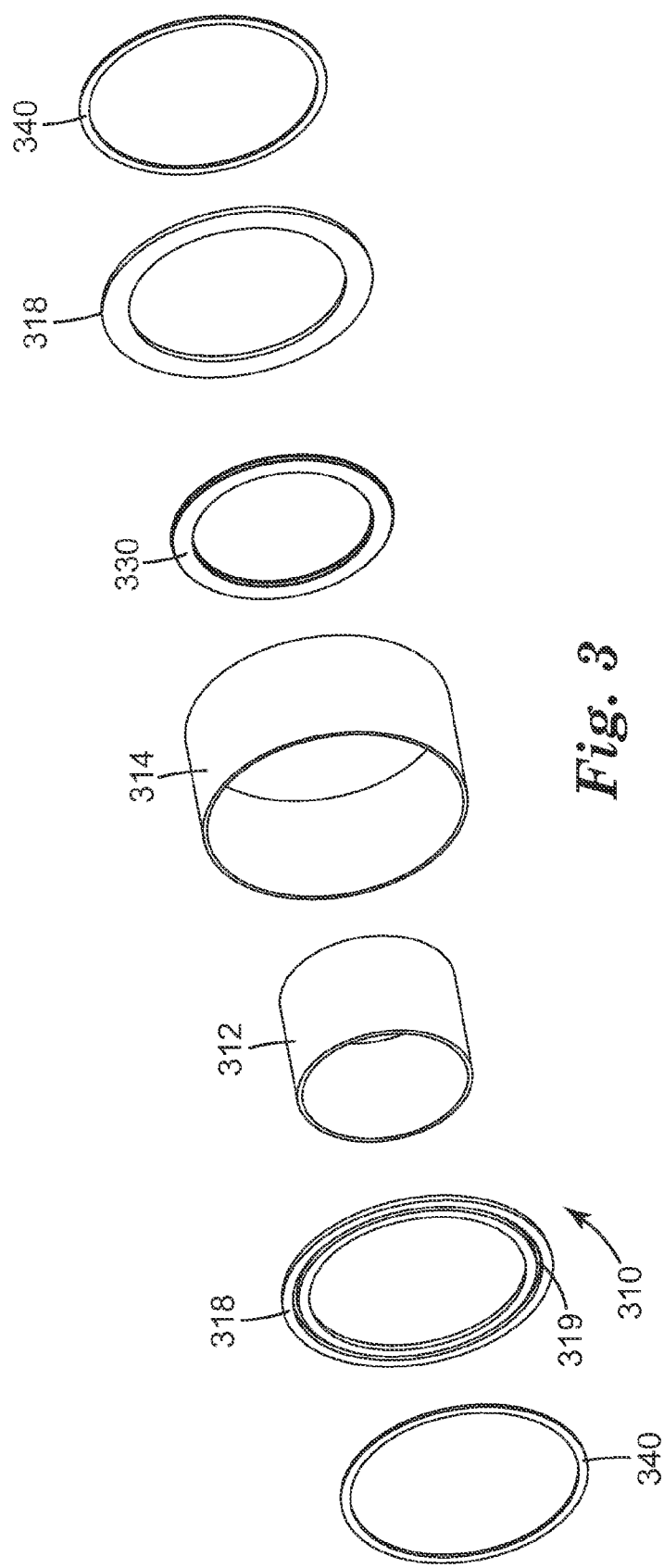
FIG. 3 shows schematically an exploded view of one exemplary filter cartridge shell.

FIG. 3 shows an exploded view of a filter cartridge shell 310 similar to the filter cartridge shell 210 shown in FIG. 2. Filter media disposed between inner wall 312 and outer wall 314 can be compressed with compression gasket 330. One or more gaskets 340 can fit into one or more gasket grooves 319 in cartridge covers 318 to seal one or more cartridge covers, 318 to one or more end caps 160 as shown in FIG. 1.

Figure 4:
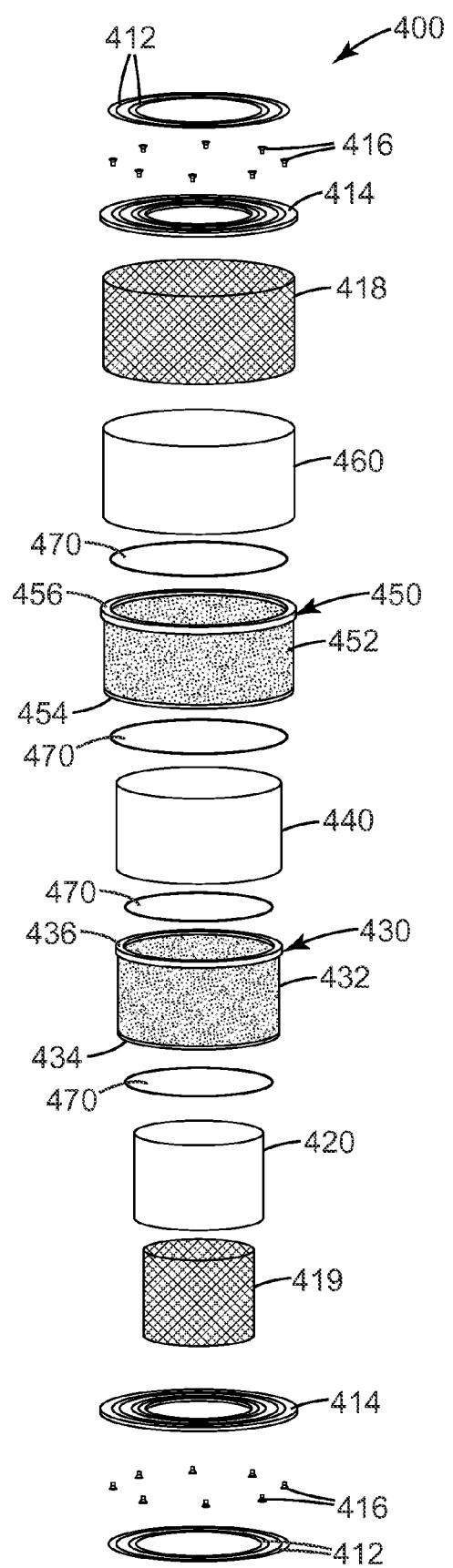
FIG. 4 shows schematically an exploded assembly view of an exemplary radial flow filtration system including five filter sections.
Figure 5:
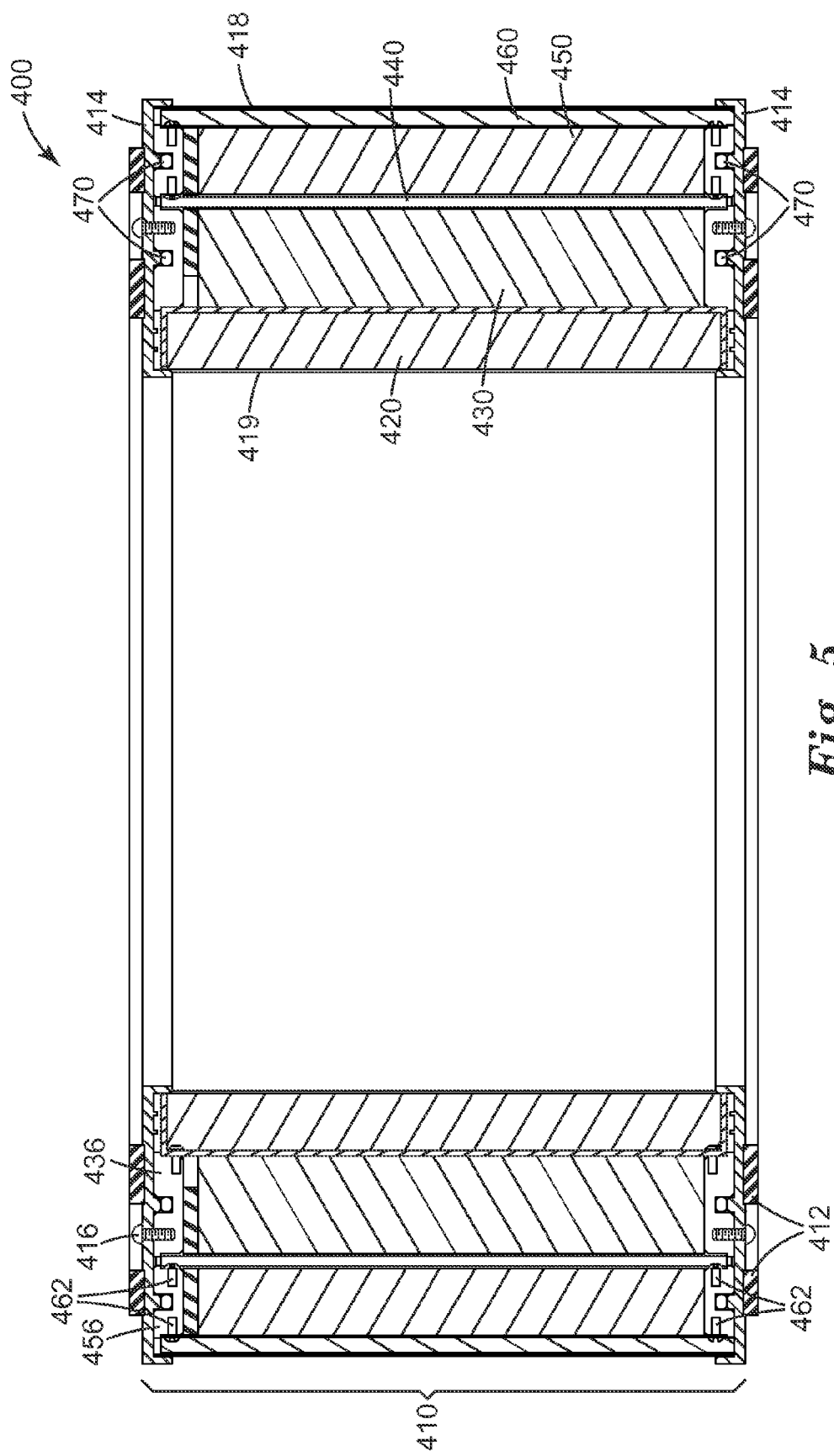
FIG. 5 shows schematically a section view of an exemplary radial flow filtration system including five filter sections.

In an exemplary embodiment, shown in FIGS. 4 and 5, filter sections 420, 440, 460 not enclosed by filter cartridge shells can also be removed and replaced, e.g., by removing a cap 414 from the housing 410, removing the filter section 420, 440, 460 and replacing it with another filter section 420, 440, 460 with similar or different filtration properties. For example, a filter section containing a carbon loaded web may be replaced with a filter section containing a zeolite loaded web. Alternatively, filter cartridges 430, 450 can also be removed from the housing 410 to enable easier replacement of the filter sections 420, 440, 460.

FIG. 4 shows an exploded assembly view of an exemplary radial flow filtration system 400 including a combination of filter sections 420, 440, 460 provided without cartridges and filter cartridges 430, 450. FIG. 5 shows a section view of the same radial flow filtration system 400. The housing 410 may include an inner protective screen 419, an outer protective screen 418, a cap 414 disposed on each end of the protective screens, and two concentric gaskets 412 attached to each cap 414 on the exterior of the housing 410. Alternatively, the housing 410 may have only one removable cap 414. Bolts 416 may be used to secure the housing end caps 414. The height of the housing can be approximately 23 to 25 centimeters and the outer diameter can be approximately 50 to 55 centimeters. Housing dimensions can be adjusted to meet the needs of any desired filter application.

In an exemplary embodiment, the filter system 400 includes five filter sections: two filter sections 432, 452 enclosed in filter cartridges 430, 450, having covers 436, 456 further enclosed in the housing 410. Filter cartridge covers 436, 456 can be sealed to end caps 414 by gaskets 470. Three filter sections 420, 440, 460 not enclosed by filter cartridge shells can be enclosed in the housing 410. The inlet 114 can be disposed at the inner circumference of the housing 410 and the outlet 116 can be disposed at the outer circumference of the housing 410.

The first filter cartridge 430 includes a first filter cartridge shell 434 and a first filter section 432, which, in an exemplary embodiment, includes a chemical filtering medium. The first filter cartridge 430 may be similar to the embodiment shown in FIG. 2. The first filter cartridge shell 434 may include inner and outer walls (shown, e.g., in FIG. 2 as 212, 214), which may be formed of perforated metal sheets such as aluminum or steel sheets or engineered plastics. The first filter cartridge shell may have a cover 436 at each end of the walls with an opening in the center of the cover. The covers 436 may be generally ring shaped. The covers can be secured to the walls by screws 462, or alternatively, by another type of fastener. Granular 12×30 mesh activated carbon may be loaded into the cartridge shell. Alternatively, any other type of chemical filtering element may be used. Spunbonded layers may also be adhesively fixed to the cylinders on the sides facing the carbon to prevent carbon from leaking out through perforations in the walls.

The second filter cartridge 450 may include a second cartridge shell 454, having walls such as those shown in FIGS. 1-3 and at least one second cover 456, and a second filter section 452. The second cartridge shell 454 may have a structure similar to the first cartridge shell 434. Granular zeolite with a 40×140 mesh size may be loaded into the cartridge shell 454 using a snowstorm filling method. Alternatively, other types of zeolite or other chemical filtering sections may be used. Spunbonded layers are adhesively fixed to the cylinders at the side facing the granular zeolite.

The third filter section 420 includes, in this embodiment, a combination of a particulate and a chemical filtering media. For example, the filter section 420 may include one or more wraps of particle loaded web, and it may be disposed around the outer perimeter of the first filter cartridge 430. The web may consist of a fibrous structure into which fine mesh carbon has been applied, for example 40×140 mesh, or coarser or finer such as described in United States Published Application No. 2006/0096911 A1. The carbon may consist of URC treated with TEDA as described in U.S. Pat. No. 6,767,860.

The fourth filter section 440 may include, in this embodiment, a combination of particulate and chemical filtering medium. For example, the filter section 440 may include one or more wraps of particle loaded web and it may be disposed around the outer perimeter of the second filter cartridge 440. An exemplary web may consist of a fibrous structure into which a fine mesh zeolite has been applied, for example 40×140 mesh, or coarser or finer. Alternatively, any other type of chemical filtering medium may be used in the fourth filter section.

The fifth filter section 460 may be disposed nearest to the inlet 114. This section 460 can include a particulate filtering medium, which may be provided in a pleated configuration and configured to target particulate contaminants. Use of a pleated medium increases surface area available for contaminant loading. Alternatively, the fifth filter section may comprise non pleated medium. For example, the first filter section 460 may be formed from a filtering medium able to deliver capture efficiencies exceeding 99.99% of particles extending into the submicron size range. Examples of such media include membranes such as an expanded polytetrafluoroethylene (PTFE) membrane.

Figure 6:
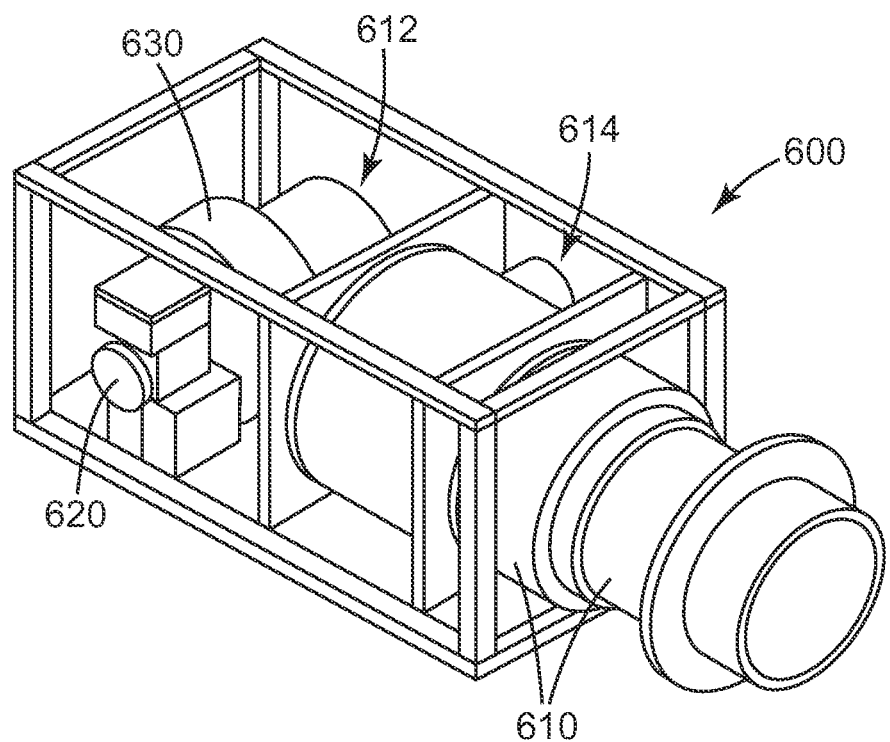
FIG. 6 shows schematically an exemplary air handling system including a radial flow filtration system according to the present disclosure.

FIG. 6 shows schematically an exemplary air handling system 600 including a radial flow filter system 610 consistent with the present disclosure. An exemplary air handling system includes a motor assembly 620 that drives a fan 630. The inlet 612 of the system may be located at the suction side of the fan 630. Air is pulled by the fan 630 through the inlet 612 and into the filter system 610. After passing through the filter system 610, the air exits the air handling system through the outlet 614, which is in fluid communication with the outer periphery of the radial flow filtration system 610. Any exemplary filtration system described above may be used as the radial flow filter system 610. The system 600 illustrated is portable and may be used in stationary or mobile applications. Alternatively, a radial flow filtration system consistent with the present disclosure could be used in permanent air handling systems, or in any other fluid filtration application.

Although the present disclosure has been described with reference to preferred embodiments, those of skill in the art will recognize that changes made be made in form and detail without departing from the spirit and scope of the present disclosure.

A radial flow filtration system of the present disclosure can include any suitable number and combination of filter cartridges including filter sections, and filter sections without cartridge shells. For example, a filter system may include at least one and as many as five or more filter cartridges that are removable with respect to the housing and include filter sections that are removable with respect to the filter cartridge shell. The filter system may additionally include any desired number and combination of filter sections without cartridge shells to meet the needs of a given application and any other suitable components in addition to those exemplified.

What is claimed is:

1. A radial flow air filtration system, comprising:
a generally cylindrical external housing with an air inlet at an inner circumference thereof and an air outlet at an outer circumference thereof, wherein the external housing comprises a central longitudinal axis,
a first annular end cap on a first end of the external housing and a second annular end cap on a second end of the external housing opposite the first end thereof, wherein the first annular end cap and the second annular end cap occupy planes generally normal to the central longitudinal axis of the external housing, and
a plurality of annular filtration sections retained in an interior region of the external housing, wherein the annular filtration sections are each coaxially arranged along the central longitudinal axis of the external housing and comprise walls in a plane generally parallel to the central axis of the external housing, the annular filtration sections comprising:
a first generally cylindrical filter cartridge comprising a first filter cartridge shell that retains a first annular filter section comprising a first wall with a first chemical filtering medium, wherein the first filter cartridge comprises a first annular cover at a first end thereof and a second annular cover at a second end thereof opposite the first end, wherein the first filter cartridge is removable from the external housing, and wherein the first annular chemical filter section is removable from the first cartridge shell;
a second generally cylindrical filter cartridge with a diameter smaller than a diameter of the first filter cartridge, the second filter cartridge comprising a second filter cartridge shell that retains a second annular filter section comprising a second wall with a second chemical filtering medium, wherein the second filter cartridge comprises a first annular cover at a first end thereof and a second annular cover at a second end thereof opposite the first end, wherein the second filter cartridge is removable from the external housing, and wherein the second annular chemical filter section is removable from the second cartridge shell;
wherein the first annular covers on the first filter cartridge and the second filter cartridge each mate with the first annular end cap on the first end of the external housing, and the second annular covers on the first filter cartridge and the second filter cartridge each mate with the second annular end caps on the second end of the external housing.

2. The radial flow filtration system of claim 1, wherein the interior region of the external housing further comprises at least one unenclosed annular filter section that is unconfined within a filter cartridge, wherein the at least one unenclosed annular filter section is removable from the external housing, and wherein the unenclosed annular filter section is coaxially arranged along the central axis of the external housing and comprises walls in a plane generally parallel to the central axis of the external housing, the walls of the unenclosed annular filter section comprising at least one of a particulate filtering medium and a chemical filtering medium.

3. The radial flow filtration system of claim 2, wherein the unenclosed annular filter section comprises a particulate filtering medium, and wherein the unenclosed annular filter section is disposed nearer the inlet of the housing than the first filter cartridge.

4. The radial flow filtration system of claim 1, wherein the first cartridge shell and the second cartridge shell comprise generally cylindrically shaped permeable walls in a plane generally parallel to the central axis of the external housing.

5. The radial flow filtration system of claim 4, wherein the first and the second annular covers on the first and the second cartridge shells are removable with respect to the permeable walls.

6. The radial flow filtration system of claim 1, wherein the first chemical filtering medium is different from the second chemical filtering medium.

7. The radial flow filtration system of claim 1, further comprising a gasket between the first annular end cap on the first end of the external housing and the first annular covers on the first filter cartridge and the second filter cartridge.

8. The radial flow filtration system of claim 7, further comprising a gasket between the second annular end caps on the second end of the external housing and the second annular covers on the first filter cartridge and the second filter cartridge.

9. The radial flow filtration system of claim 2, further comprising a generally cylindrical protective screen within or outside of the unenclosed annular filter section.

10. The radial flow filtration system of claim 1, wherein at least one of the first and the second chemical filtering media comprise an activated carbon or a zeolite.

11. The radial flow filtration system of claim 2, wherein the system comprises a plurality of unenclosed annular filter sections, each comprising a particulate filtering medium.

12. The radial flow filtration system of claim 11, wherein at least one of the unenclosed annular filter sections comprises a pleated particulate filtering medium.

13. The radial flow filtration system of claim 11, wherein at least one of the unenclosed annular filter sections further comprises a chemical filtering medium.

14. A radial flow air filtration system, comprising:
a generally cylindrical external housing with an air inlet at an inner circumference thereof and an air outlet at an outer circumference thereof, wherein the external housing comprises a central longitudinal axis, a first annular end cap on a first end of the external housing and a second annular end cap on a second end of the external housing opposite the first end thereof, wherein the first annular end cap and the second annular end cap occupy planes generally normal to the central longitudinal axis of the external housing, and
a plurality of annular filtration sections retained in an interior region of the external housing, wherein the annular filtration sections are each coaxially arranged along the central longitudinal axis of the external housing and comprise walls in a plane generally parallel to the central axis of the external housing, the annular filtration sections comprising:
an unenclosed annular filter section unconfined within a filter cartridge, wherein the unenclosed annular filter section is removable from the external housing, wherein the unenclosed annular filter section is proximal the air inlet of the external housing, and wherein the unenclosed annular filter section comprises walls comprising a particulate filtering medium;
a first generally cylindrical filter cartridge downstream of the unenclosed annular filter section and comprising a first filter cartridge shell that retains a first annular filter section comprising a first wall with a first chemical filtering medium, wherein the first filter cartridge comprises a first annular cover at a first end thereof and a second annular cover at a second end thereof opposite the first end, wherein the first filter cartridge is removable from the external housing, and wherein the first annular chemical filter section is removable from the first cartridge shell;
a second generally cylindrical filter cartridge with a diameter smaller than a diameter of the first filter cartridge, wherein the second filter cartridge is downstream from the first filter cartridge, the second filter cartridge comprising a second filter cartridge shell that retains a second annular filter section comprising a second wall with a second chemical filtering medium, wherein the second filter cartridge comprises a first annular cover at a first end thereof and a second annular cover at a second end thereof opposite the first end, wherein the second filter cartridge is removable from the external housing, and wherein the second annular chemical filter section is removable from the second cartridge shell;
wherein the first annular covers on the first filter cartridge and the second filter cartridge each mate with the first annular end cap on the first end of the external housing, and the second annular covers on the first filter cartridge and the second filter cartridge each mate with the second annular end caps on the second end of the external housing.

15. The radial flow filtration system of claim 14, wherein the first cartridge shell and the second cartridge shell comprise generally cylindrically shaped permeable walls in a plane generally parallel to the central axis of the external housing.

16. The radial flow filtration system of claim 14, wherein the first chemical filtering medium is different from the second chemical filtering medium.

17. The radial flow filtration system of claim 14, further comprising gaskets between the first annular end cap on the first end of the external housing and the first annular covers on the first filter cartridge and the second filter cartridge, and gaskets between the second annular end caps on the second end of the external housing and the second annular covers on the first filter cartridge and the second filter cartridge.

18. The radial flow filtration system of claim 14, further comprising a generally cylindrical protective screen adjacent to the unenclosed annular filter section.

19. The radial flow filtration system of claim 14, wherein at least one of the first and the second chemical filtering media comprise an activated carbon or a zeolite.

20. The radial flow filtration system of claim 2, wherein the system comprises a second unenclosed annular filter section between the first filter cartridge and the second filter cartridge.

21. The radial flow filtration system of claim 2, wherein the system comprises a third unenclosed annular filter section downstream of the second filter cartridge and proximal the air outlet of the external housing.

22. The radial flow filtration system of claim 14, wherein the unenclosed annular filter section comprises a pleated particulate filtering medium.

* * * * *